April 5, 1938.   J. W. LEIGHTON   2,112,914
SHOCK ABSORBER BRACKET
Filed July 6, 1936
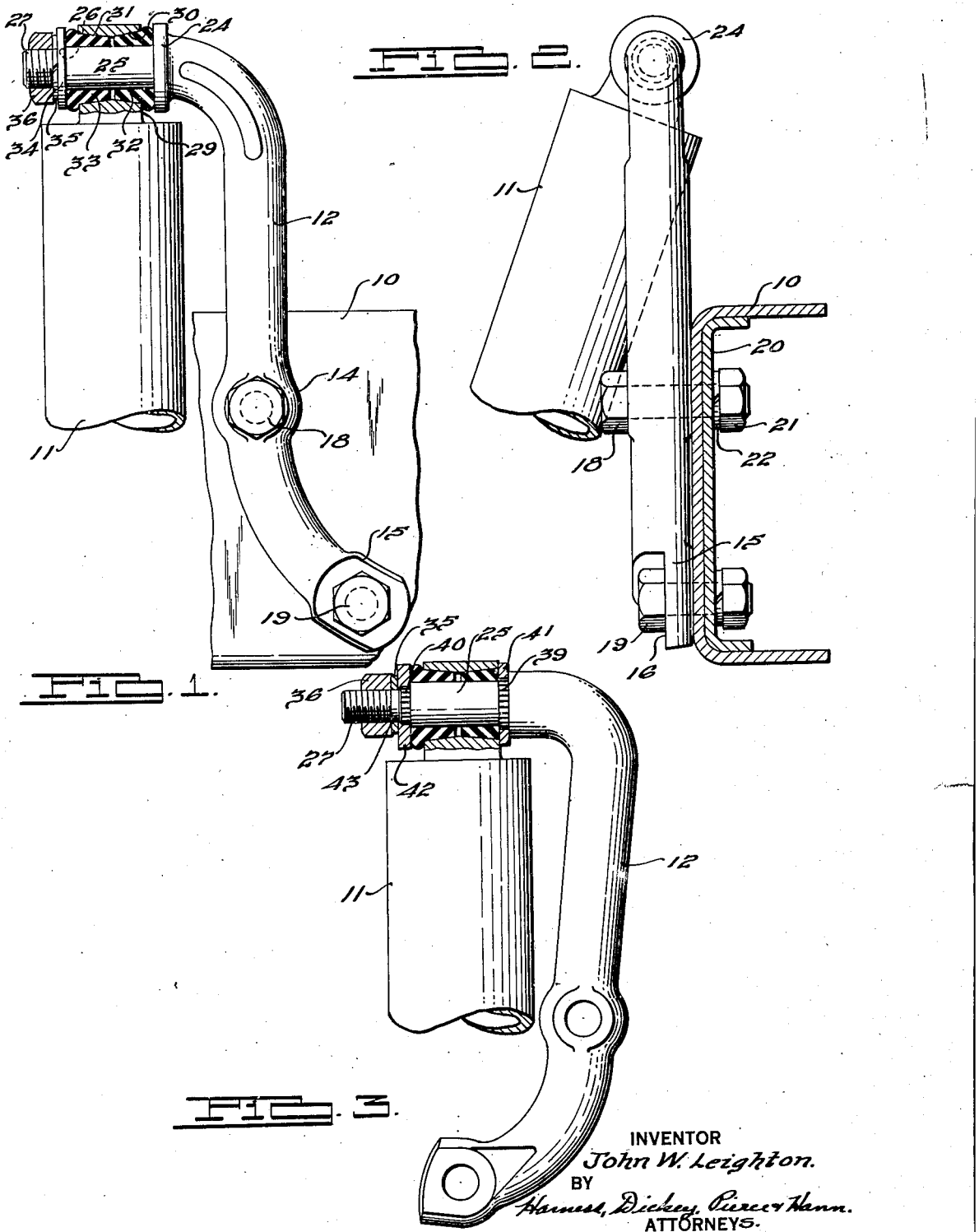
INVENTOR
John W. Leighton.
BY
Harness, Dickey, Pierce & Hann.
ATTORNEYS.

Patented Apr. 5, 1938

2,112,914

UNITED STATES PATENT OFFICE 2,112,914

SHOCK ABSORBER BRACKET

John W. Leighton, Port Huron, Mich.

Application July 6, 1936, Serial No. 89,091

2 Claims. (Cl. 267—8)

The invention relates generally to automobiles and it has particular relation to a connection between a shock absorber and the chassis frame.

One object of the invention is to provide an improved means for pivotally anchoring one end of a shock absorber on a chassis frame but at a point vertically above the latter.

Another object of the invention is to provide a means of the above designated character which can inexpensively be manufactured from bar stock, which can be assembled easily, and which possesses the required rigidity to hold the upper end of the shock absorber in position.

Other objects of the invention will become apparent from the following specification, from the drawing to which the specification relates, and from the claims hereinafter set forth.

For a better understanding of the invention, reference may be had to the drawing, wherein:

Figure 1 is a fragmentary, side elevational view, illustrating a shock absorber and chassis frame with the shock absorber pivotally anchored on the frame according to one form of the invention;

Figure 2 is an end elevational view of the arrangement shown by Figure 1; and

Figure 3 is a view similar to Figure 1 but illustrating another form of the invention.

Referring to Figures 1 and 2, the chassis frame of the automobile is indicated at 10 and in this instance the frame comprises a channel iron. A conventional shock absorber of the tubular type is indicated at 11 and it will be understood that in general this type of shock absorber includes a plunger and cylinder, which relatively reciprocate during relative vertical movement of the frame and axle of the automobile. While the axle is not shown, it will be understood that the plunger extends downwardly and is anchored thereto. For anchoring the tubular part of the shock absorber on the frame, and at a point vertically above the latter, a bar 12, generally of S-shape, is provided, and the lower end of the bar is upset at linearly spaced points, indicated at 14 and 15, which are apertured for receiving fastening bolts. Upsetting of the portions 14 and 15 increases the strength of the bar around the bolt openings and additionally provides flat surface areas of substantial dimensions for engaging the side of the frame. It will be noted in Figure 2 that the upset portion 15 is cut away at the outer side of the bar and this is desirable particularly because it insures mounting of the bar in proper position. In other words, anyone mounting the bar on the frame will realize that the cut away part 16 must be outward and it follows that the upper end of the bar will be in a proper position for connection with the shock absorber.

Bolts 18 and 19 passing through the apertures in the portions 14 and 15 of the bar are employed for fastening it to the frame and these bolts pass through openings in the frame and through a channel shaped supporting or backing plate 20 located at the inner side of the frame. At its inner end, each bolt is provided with a nut 21 and lock washer 22 for fastening the parts rigidly together.

The upper end of the bar is provided with an integral, enlarged flange 24, and outwardly of the flange, a cylindrical bearing portion 25 of reduced diameter is provided. Outwardly of the bearing portion 25, a short, annular surface 26 of slightly smaller diameter, as compared to that of the bearing portion 25 is provided, and outwardly of this surface, the end of the bar is additionally reduced in diameter and is threaded, as indicated at 27.

The tubular part of the shock absorber is provided with an integral eye 29 and opposite ends of the opening in the eye are of conical shape, as indicated at 30 and 31, respectively. The eye is adapted to receive the bearing portion 25 of the bar and between the conical portions 30 and 31 of the eye opening, and the outer surface of the bearing portion of the bar, rubber bushings 32 and 33 are provided, which are of substantially complementary shape with respect to the conical portions 30 and 31 of the opening and the cylindrical surface of the bearing portion. When the bushings are in place, a washer 34 is disposed on the annular surface 26 and then the lock washer 35 and nut 36 are mounted on the threaded end of the bar and the nut is tightened. It will be noted that the rubber bushings have their end faces engaging the integral flange 24 on the bar and the washer 34, respectively, and accordingly, when the nut 36 is tightened, the bushings are axially compressed and this expands the bushings into tightly fitting engagement with the opening in the eye and the bearing portion 25. It will be understood, of course, that the bushings provide a resilient mounting that permits the required amount of pivotal movement necessary during operation of the shock absorber, when the axle and frame move relatively.

In the construction shown by Figure 3, the lower end of the bar is turned oppositely to the lower end of the bar shown by Figure 2 and therefore this bar is of U-shape. The openings in the frame for mounting this bar necessarily will have to be located differently, but in general, the bar is mounted on the frame in the same way as previously described in connection with Figures 1 and 2. In this construction, instead of providing an integral upset flange 24, as shown by Figure 1, at the upper end of the bar, a serrated surface 39 is provided at the right end of the bearing portion 25 and this surface is slightly larger in diameter as compared to the bearing portion and is slightly smaller in diameter as compared to the body portion of the bar at the right of the bearing portion. A similar annular surface 40, of intermediate diameter, is provided between the bearing portion 25 and the threaded end 27. These serrated surfaces are adapted to receive washers 41 and 42, which engage opposite end surfaces of the rubber bushings. It may be noted also that an annular smooth surface is provided between the serrated surface 40 and the threaded end 27, as indicated at 43, and while this smooth surface is not essential, it may be desirable for seating the lock washer 35.

The invention illustrated is so designed that the mounting member may be inexpensively manufactured from round bar stock. The shape of the bar is such that the required rigidity is obtained in a very simple way, and without requiring expensive manufacturing operations. Mounting of the bar on the frame is a relatively simple operation, as it is only necessary to insert two bolts and tighten them and then a very rigid mounting for the upper end of the shock absorber is obtained. Principally the invention provides a mounting member of minimum cost, which is strong and rigid, and which can be mounted on the frame and assembled with the shock absorber in a minimum amount of time and with a minimum amount of effort.

Although more than one form of the invention has been illustrated and described in detail, it will be apparent to those skilled in the art that various modifications may be made without departing from the scope of the appended claims.

What is claimed is:

1. A shock absorber mounting member comprising a bar of substantially round stock having curved end portions located in the same plane as the remainder of the bar, one of such end portions terminating in a reduced bearing portion, a further reduced threaded portion outwardly of the bearing portion and a shoulder at the inner end of the bearing portion so as to provide means for attaching the shock absorber to the bar, the other curved end portion of the bar being upset to provide reinforced sectors at longitudinally spaced points and each sector having a bolt receiving opening for fastening the bar to a chassis frame, said openings extending transversely to the plane of the bar and being located at different distances from a plane normal to the axis of the bearing portion, and said upset sectors having flat sides adapted to provide flat areas of engagement with the frame, the bar between said sectors being retained in its rounded form.

2. A shock absorber mounting member comprising a bar of rounded stock having bent end portions located in the same plane as the remainder of the bar, one of such end portions having a reduced section providing a bearing for a shock absorber, the other end portion being upset axially to provide reinforced and laterally enlarged sectors, each of which has a bolt receiving opening for fastening the bar to a chassis frame, each of said sectors having a flat side adapted to provide flat areas of engagement with the frame, the bar between such sectors being retained in its rounded form.

JOHN W. LEIGHTON.